US009724963B2

(12) United States Patent
Aoki et al.

(10) Patent No.: US 9,724,963 B2
(45) Date of Patent: Aug. 8, 2017

(54) HUB UNIT

(71) Applicant: JTEKT CORPORATION, Osaka-shi, Osaka (JP)

(72) Inventors: Takayoshi Aoki, Tachikawa (JP); Satoshi Kitagawa, Yokohama (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/037,861

(22) PCT Filed: Dec. 8, 2014

(86) PCT No.: PCT/JP2014/082378
§ 371 (c)(1),
(2) Date: May 19, 2016

(87) PCT Pub. No.: WO2015/093331
PCT Pub. Date: Jun. 25, 2015

(65) Prior Publication Data
US 2016/0288567 A1    Oct. 6, 2016

(30) Foreign Application Priority Data

Dec. 17, 2013  (JP) ................................ 2013-259905

(51) Int. Cl.
*F16C 13/02*    (2006.01)
*F16C 33/76*    (2006.01)
(Continued)

(52) U.S. Cl.
CPC ........ *B60B 27/0073* (2013.01); *B60B 27/001* (2013.01); *B60B 27/02* (2013.01);
(Continued)

(58) Field of Classification Search
CPC .............. B60B 27/0073; B60B 27/001; B60B 2900/211; B60B 2900/212;
(Continued)

(56) References Cited

U.S. PATENT DOCUMENTS

| 2012/0281939 A1 | 11/2012 | Nakamura et al. |
| 2015/0078691 A1 | 3/2015 | Nakamura |
| 2015/0147013 A1 | 5/2015 | Kaneko |

FOREIGN PATENT DOCUMENTS

| JP | WO 2008081875 A1 * | 7/2008 | ............ F16C 33/723 |
| JP | WO 2009119036 A1 * | 10/2009 | ......... B60B 27/0005 |

(Continued)

OTHER PUBLICATIONS

Feb. 24, 2015 International Search Report issued in International Patent Application No. PCT/JP2014/082378.

*Primary Examiner* — Phillip A Johnson
(74) *Attorney, Agent, or Firm* — Oliff PLC

(57) ABSTRACT

A hub unit includes: a bearing section including an outer ring, an inner ring disposed coaxially with and inside the outer ring, rolling elements disposed in a bearing inner space, and a sealing member sealing the bearing inner space at an end on a vehicle inner side; a hub ring including a body portion, and a wheel mounting flange portion on which a wheel is to be mounted; and a covering member protecting the bearing section from a foreign substance. The covering member is fixed to rotate integrally with the hub ring and the inner ring, and covers an end on the vehicle inner side of the bearing section. A part of the covering member opposing to an end surface on the vehicle inner side of the outer ring is not parallel to the end surface.

5 Claims, 7 Drawing Sheets

(51) Int. Cl.
  *B60B 27/00* (2006.01)
  *F16C 33/72* (2006.01)
  *F16C 33/78* (2006.01)
  *F16C 33/80* (2006.01)
  *B60B 27/02* (2006.01)
  *F16C 41/00* (2006.01)
  *F16C 19/38* (2006.01)

(52) U.S. Cl.
  CPC .......... *F16C 19/385* (2013.01); *F16C 33/723* (2013.01); *F16C 33/7883* (2013.01); *F16C 33/805* (2013.01); *B60B 2900/211* (2013.01); *B60B 2900/212* (2013.01); *B60B 2900/511* (2013.01); *F16C 19/386* (2013.01); *F16C 41/007* (2013.01); *F16C 2326/02* (2013.01)

(58) Field of Classification Search
  CPC ....... B60B 2900/511; B60B 2900/5112; B60B 2900/5114; F16C 19/385; F16C 33/723; F16C 33/7883; F16C 33/805; F16C 2326/02
  See application file for complete search history.

(56) References Cited

FOREIGN PATENT DOCUMENTS

| | | | | |
|---|---|---|---|---|
| JP | 2011-098714 A | 5/2011 | | |
| JP | WO 2012039427 A1 * | 3/2012 | ............ | F16C 33/723 |
| JP | 2012-121390 A | 6/2012 | | |
| JP | 2013-092213 A | 5/2013 | | |
| NL | WO 2008145162 A1 * | 12/2008 | ........... | B60B 7/0013 |
| WO | 2013/141319 A1 | 9/2013 | | |

* cited by examiner

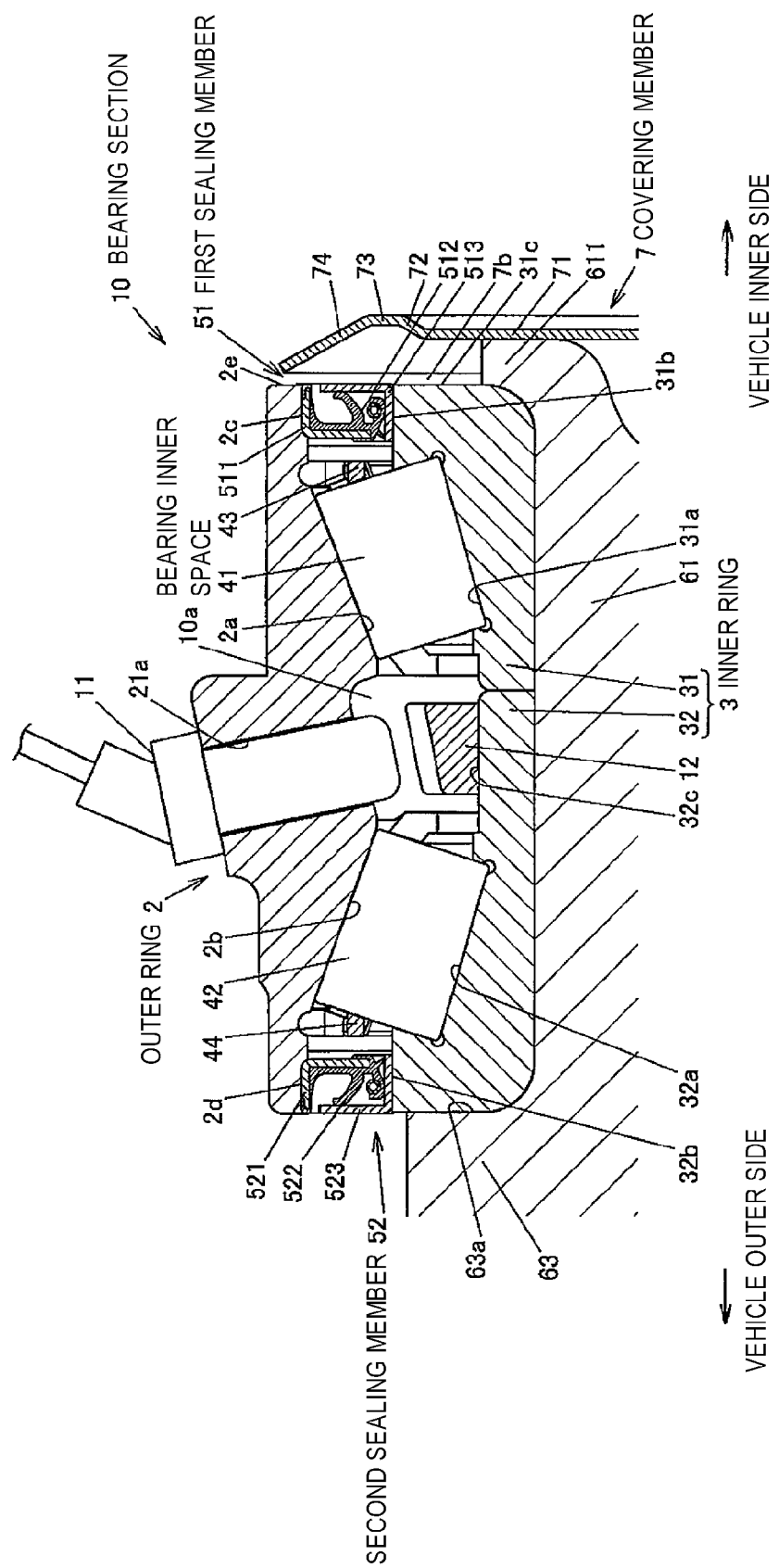

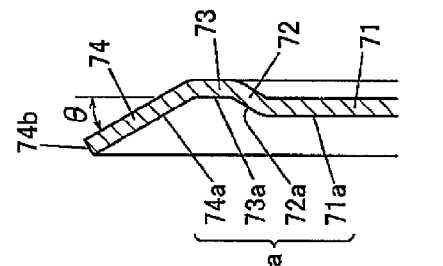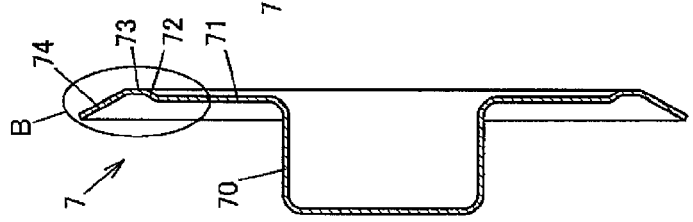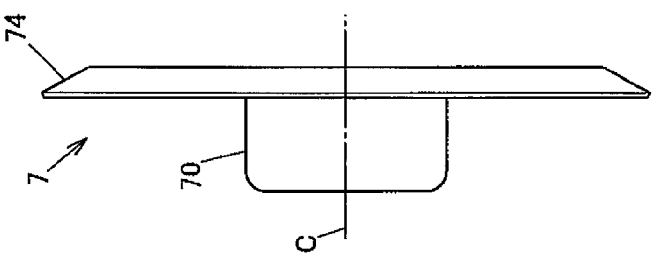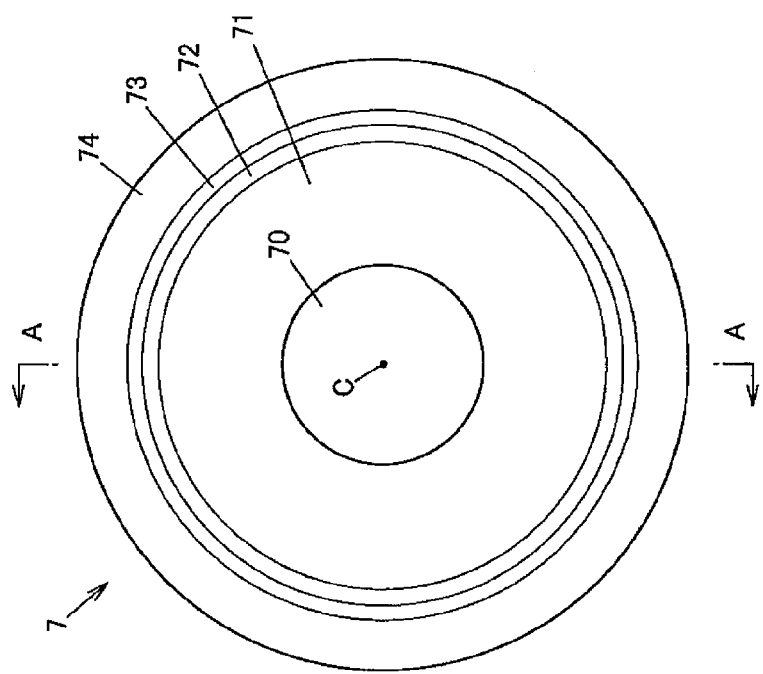

(FIRST EMBODIMENT)

(COMPARATIVE EXAMPLE)

(SECOND EMBODIMENT)

(THIRD EMBODIMENT)

HUB UNIT

TECHNICAL FIELD

The present invention relates to a hub unit rotatably supporting a wheel on a vehicle body.

BACKGROUND ART

Some of hub units according to a related art include a covering member for protecting a sealing member from foreign substances such as muddy water and gravels for improving the resistance to foreign substances (see, for example, Patent Literature 1).

A hub unit (rolling bearing unit) described in Patent Literature 1 includes a hub constructed by a combination of a hub main body and an inner ring, and an outer ring disposed outside the inner ring. Besides, the hub unit further includes a sealing member disposed between the inner ring and the outer ring, and a covering member covering ends on a vehicle inner side (a vehicle body side) of the outer ring and the sealing member. The outer ring is supported on a suspension disposed on the vehicle body side with a plurality of rolling elements disposed between the outer ring and the inner ring. The hub main body is provided with a wheel mounting flange for mounting a wheel thereon.

The covering member includes a large-diameter cylindrical portion, an outer diameter side sidewall portion extending inward from an end on the vehicle inner side of the large-diameter cylindrical portion, and a middle-diameter cylindrical portion extending from an inner end of the outer diameter side sidewall portion toward the vehicle inner side. Besides, the covering member includes an inner diameter side sidewall portion extending inward from an end on the vehicle inner side of the middle-diameter cylindrical portion, and a small-diameter cylindrical portion extending from an inner end of the inner-diameter side sidewall portion toward a vehicle outer side. The large-diameter cylindrical portion is fit on the outer circumferential surface of the outer ring. An end on the vehicle inner side of the sealing member is surrounded by the middle-diameter cylindrical portion, the inner diameter side sidewall portion and the small-diameter cylindrical portion of the covering member. The covering member inhibits muddy water from splashing on and gravels or the like from hitting the sealing member and its surrounding portion.

Besides, the covering member is provided with a drain hole in a part thereof that is positioned at a lower end when used and corresponds to a portion extending across the middle-diameter cylindrical portion and the outer diameter side sidewall portion. A foreign substance such as muddy water having entered the covering member through, for example, a small gap between the large-diameter cylindrical portion of the covering member and the outer ring is discharged through the drain hole.

CITATION LIST

Patent Literature

Patent Literature 1: JP-A2011-98714

SUMMARY OF INVENTION

Technical Problem

If a foreign substance such as muddy water having entered the covering member remains inside the covering member, the remaining foreign substance may adhere to a sliding contact portion such as a seal lip of the sealing member to cause abrasion in some cases. This may degrade the sealing property. Accordingly, a foreign substance having entered the covering member is preferably promptly discharged to the outside.

In the hub unit of Patent Literature 1, however, a foreign substance such as muddy water remains inside the covering member until it flows down by its own weight to be discharged through the drain hole. If this foreign substance is scattered by vibration or the like of the vehicle to adhere to the sealing member, it is apprehended that the sealing property may be degraded.

Accordingly, an object of the present invention is to provide a hub unit capable of inhibiting degradation of the sealing property of a sealing member otherwise caused by a foreign substance having entered a covering member by urging discharge of the foreign substance.

Solution to Problem

In order to achieve the above-described object, the present invention provides a hub unit comprising: a bearing section including an outer ring unrotatably mounted on a vehicle body side, an inner ring disposed coaxially with and inside the outer ring, a plurality of rolling elements disposed in a bearing inner space between the outer ring and the inner ring, and a sealing member sealing the bearing inner space at an end on a vehicle inner side; a hub ring including a body portion inserted inside the inner ring, and a wheel mounting flange portion on which a wheel is to be mounted; and a covering member protecting the bearing section from a foreign substance, wherein the covering member is fixed to rotate integrally with the hub ring and the inner ring, and covers an end on the vehicle inner side of the bearing section, and a part of the covering member opposing to an end surface on the vehicle inner side of the outer ring is not parallel to the end surface.

Besides, a maximum distance along an axial direction between the sealing member and the covering member may be larger than a distance along the axial direction between the inner ring and the covering member.

Furthermore, in order to achieve the above-described object, the present invention provides a hub unit comprising: a bearing section including an outer ring unrotatably mounted on a vehicle body side, an inner ring disposed coaxially with and inside the outer ring, a plurality of rolling elements disposed in a bearing inner space between the outer ring and the inner ring, and a sealing member sealing the bearing inner space at an end on a vehicle inner side; a hub ring including a body portion inserted inside the inner ring, and a wheel mounting flange portion on which a wheel is to be mounted; and a covering member protecting the bearing section from a foreign substance, wherein the covering member is fixed to rotate integrally with the hub ring and the inner ring, and includes a wall portion covering an end on the vehicle inner side of the bearing section and a cylindrical portion covering an outer circumferential surface at an end on the vehicle inner side of the outer ring, and a gap is formed between the cylindrical portion of the covering member and the outer circumferential surface of the outer ring.

Besides, at least a part of an inner circumferential surface of the cylindrical portion of the covering member may be in a tapered shape having an inner diameter increasing toward a vehicle outer side.

In addition, a maximum distance along an axial direction between the sealing member and the covering member may be larger than a distance along the axial direction between the inner ring and the covering member.

Advantageous Effects of Invention

According to the present invention, degradation of the sealing property of a sealing member otherwise caused by a foreign substance having entered a covering member of a hub unit can be inhibited by urging discharge of the foreign substance.

BRIEF DESCRIPTION OF DRAWINGS

FIG. 2 is an enlarged view of a bearing section of FIG. 1.

FIG. 3(a) is a plan view taken from a vehicle outer side of a covering member, FIG. 3(b) is a side view of the covering member, FIG. 3(c) is a cross-sectional view taken on line A-A of FIG. 3(a), and FIG. 3(d) is an enlarged view of a part B of FIG. 3(c).

FIGS. 8(a) and 8(b) illustrate a covering member according to a third embodiment of the present invention, in which FIG. 8(a) is a cross-sectional view of a part on an outer circumferential side of the covering member and FIG. 8(b) is an enlarged cross-sectional view of a part of FIG. 8(a).

DESCRIPTION OF EMBODIMENTS

First Embodiment

A first embodiment of the present invention will now be described with reference to FIGS. 1 to 5.

(Whole Structure of Hub Unit 1)

Figure 1:
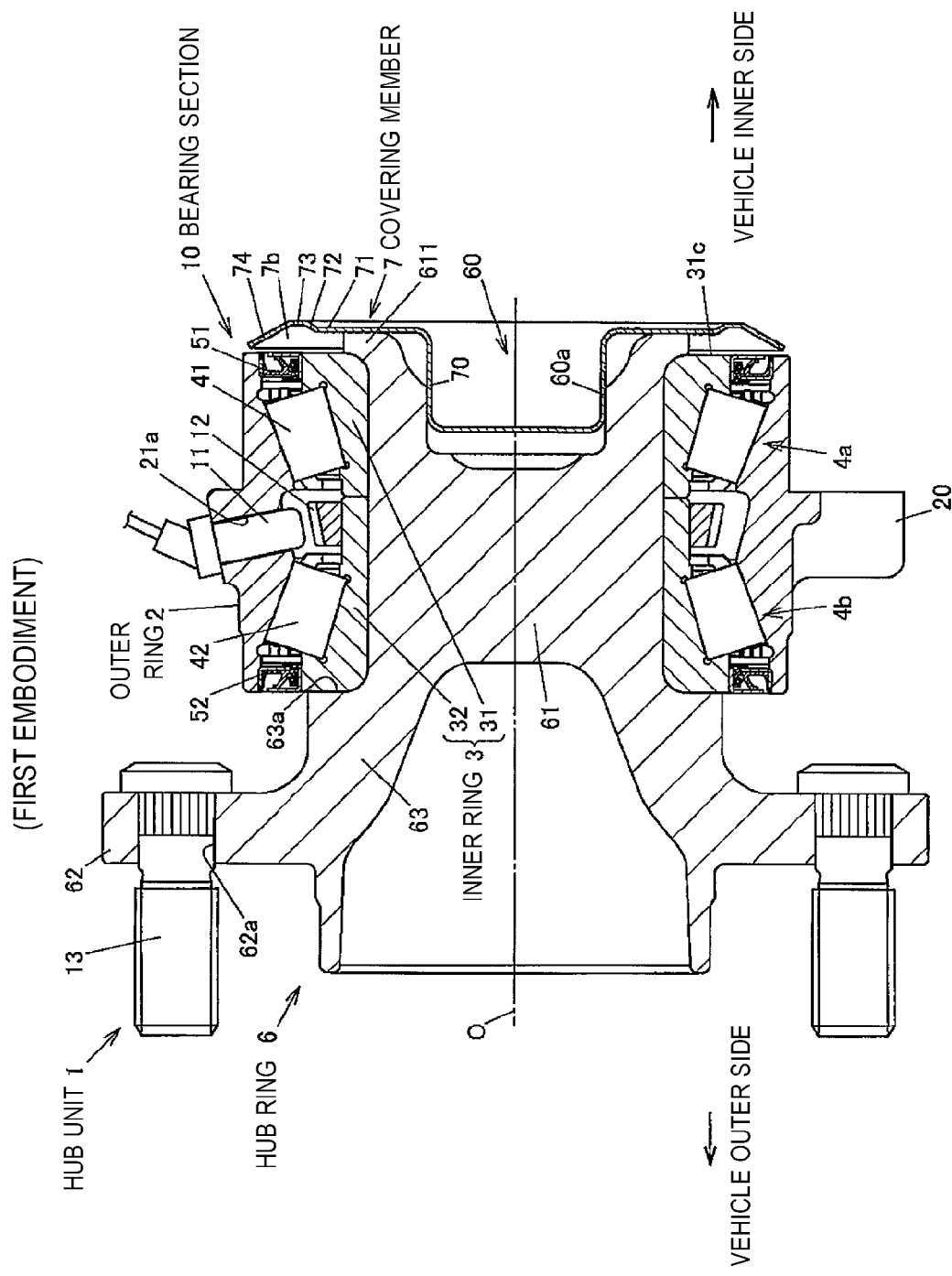
FIG. 1 is a cross-sectional view of a whole hub unit according to a first embodiment of the present invention.

FIG. 1 is a cross-sectional view of a whole hub unit 1 according to the first embodiment of the present invention. FIG. 2 is an enlarged view of a bearing section of FIG. 1. This hub unit 1 is used for rotatably supporting a wheel on a vehicle body. In FIGS. 1 and 2, a wheel is attached on the left side of the hub unit 1, and the right side of the hub unit 1 corresponds to a wheel housing side of the vehicle body. In the following description, the side of the hub unit 1 on which the wheel is attached (the left side in FIGS. 1 and 2) is designated as a vehicle outer side, and the opposite side (the right side in FIGS. 1 and 2) is designated as a vehicle inner side.

The hub unit 1 includes a bearing section 10, a hub ring 6, and a covering member 7 protecting the bearing section 10 from foreign substances. The bearing section 10 includes an outer ring 2, an inner ring 3, a plurality of rolling elements 41 and 42, a first sealing member 51, and a second sealing member 52. The plural rolling elements 41 are disposed at equal intervals along a circumferential direction of a rotation axis O of the inner ring 3 and the hub ring 6 to constitute a first rolling element row 4a. The plural rolling elements 42 are disposed at equal intervals along the circumferential direction of the rotation axis O on the vehicle outer side of the first rolling element row 4a to construct a second rolling element row 4b.

(Structure of Bearing Section 10)

As illustrated in FIG. 2, the outer ring 2 includes, on its inner circumferential side, an outer raceway surface 2a on which the plural rolling elements 41 are allowed to move by rolling, and an outer raceway surface 2b on which the plural rolling elements 42 are allowed to move by rolling. Besides, the outer ring 2 includes, on its inner circumferential side, seal mounting surfaces 2c and 2d on which the first and second sealing members 51 and 52 are respectively mounted. The seal mounting surfaces 2c and 2d are formed at ends of the outer ring 2. The outer raceway surfaces 2a and 2b are formed in a tapered shape having an inner diameter increasing toward the ends of the outer ring 2.

The outer ring 2 is fixed on a knuckle of a suspension not shown to be unrotatably mounted on a side of the vehicle body. A vehicle mounting flange 20 (illustrated in FIG. 1) for used in the mounting on the knuckle is formed on an outer circumferential side of the outer ring 2. Besides, a sensor mounting hole 21a for mounting a rotation sensor 11 is formed in the outer ring 2. The sensor mounting hole 21a is opened between the pair of outer raceway surfaces 2a and 2b. A tip portion of the rotation sensor 11 protruding beyond the opening opposes to a pulser ring 12 fixed on the inner ring 3. The rotation sensor 11 detects the rotation of the inner ring 3 on the basis of change in a magnetic field formed through the rotation relative to the pulser ring 12, and outputs a detection signal to an ABS (Antilock Brake System) controller not shown.

The inner ring 3 includes a first inner ring member 31 and a second inner ring member 32. The inner ring 3 is disposed inside and coaxially with the outer ring 2. The first inner ring member 31 and the second inner ring member 32 are arranged in a line along the direction of the rotation axis O. Along the direction of the rotation axis O, the first inner ring member 31 is disposed on the vehicle inner side, and the second inner ring member 32 is disposed on the vehicle outer side.

The first inner ring member 31 has an inner raceway surface 31a that opposes to the outer raceway surface 2a of the outer ring 2 for allowing the plural rolling elements to move by rolling thereon. Besides, the first inner ring member 31 has a seal mounting surface 31b opposing to the seal mounting surface 2c of the outer ring 2. The inner raceway surface 31a is formed in a tapered shape having an outer diameter increasing toward the vehicle inner side.

The second inner ring member 32 has an inner raceway surface 32a that opposes to the outer raceway surface 2b of the outer ring 2 for allowing the plural rolling elements 42 to move by rolling thereon. Besides, the second inner ring member 32 has a seal mounting surface 32b opposing to the seal mounting surface 2d of the outer ring 2, and a ring mounting surface 32c on which the pulser ring 12 is mounted. The inner raceway surface 31a is formed in a tapered shape having an outer diameter increasing toward the vehicle outer side.

The plural rolling elements 41 and the plural rolling elements 42 are disposed in a bearing inner space 10a formed between the outer ring 2 and the inner ring 3. The plural rolling elements 41 are held by a ring-shaped cage 43, so as to move by rolling on the outer raceway surface 2a of the outer ring 2 and the inner raceway surface 31a of the first inner ring member 31. The plural rolling elements 42 are held by a ring-shaped cage 44, so as to move by rolling on the outer raceway surface 2b of the outer ring 2 and the inner raceway raceway surface 32a of the second inner ring member 32. Each of the rolling elements 41 and 42 is a tapered roller, which is disposed to have a central axis inclined against the rotation axis O.

The first sealing member 51 is disposed between the seal mounting surface 2c of the outer ring 2 and the seal mounting surface 31b of the first inner ring member 31. The first sealing member 51 seals the bearing inner space 10a at an end on the vehicle inner side. The second sealing member 52 is disposed between the seal mounting surface 2d of the outer ring 2 and the seal mounting surface 32b of the second inner ring member 32. The second sealing member 52 seals the bearing inner space 10a at an end on the vehicle outer side.

The first sealing member 51 includes a core plate 511, an elastic member 512 and a slinger 513. The core plate 511 is fixed by press fit inside the seal mounting surface 2c of the outer ring 2. The elastic member 512 is made of, for example, a synthetic rubber, and is caused to adhere to the core plate 511 by vulcanized adhesion. The slinger 513 is fixed by press fit outside the seal mounting surface 31b of the first inner ring member 31. The slinger 513 is in sliding contact with a plurality of lip portions of the elastic member 512.

The second sealing member 52 is constructed similarly to the first sealing member 51. Specifically, the second sealing member 52 includes a core plate 521, an elastic member 522 and a slinger 523. The core plate 521 is fixed by press fit inside the seal mounting surface 2d of the outer ring 2, and the elastic member 522 is caused to adhere to the core plate 521 by the vulcanized adhesion. The slinger 523 is fixed by press fit outside the seal mounting surface 32b of the second inner ring member 32, and is in sliding contact with a plurality of lip portions of the elastic member 522.

Grease not shown is sealed as a lubricant within the bearing inner space 10a of the bearing section 10. The first sealing member 51 and the second sealing member 52 prevent the grease from leaking as well as prevent foreign substances from entering the bearing inner space 10a. The outer ring 2, the inner ring 3 (the first and second inner ring members 31 and 32) and the rolling elements 41 and 42 are made of an iron-based material such as a high carbon chromium bearing steel or a carbon steel.

(Structure of Hub Ring 6)

The hub ring 6 integrally includes a body portion 61 inserted inside the inner ring 3, a wheel mounting flange portion 62 and a connecting portion 63 connecting the body portion 61 and the wheel mounting flange portion 62 to each other. The hub ring 6 is made of, for example, a medium carbon steel. A wheel not shown is mounted on the wheel mounting flange portion 62. The body portion 61 has a caulking portion 611 formed by extending outward an end thereof protruding beyond an end surface 31c on the vehicle inner side of the first inner ring member 31 of the inner ring 3. The caulking portion 611 fixes, by caulking, the inner ring 3 between the caulking portion and an end surface 63a on the side of the body portion 61 of the connecting portion 63.

The wheel mounting flange portion 62 has a plurality of bolt insertion holes 62a for inserting hub bolts 13. In each bolt insertion hole 62a, the hub bolt 13 is fixed by press fit. On the vehicle outer side of the wheel mounting flange portion 62, the wheel of a tire is fixed together with a break disc rotor between the wheel mounting flange portion and hub nuts not shown into which the hub bolts 13 are screwed.

Besides, the hub ring 6 has, in a center at an end on the vehicle inner side of the body portion 61, a recess portion 60 opening toward the vehicle inner side. The recess portion 60 has a cylindrical inner surface 60a. The central axis of the recess portion 60 accords with the rotation axis O.

(Structure of Covering Member 7)

FIGS. 3(a), 3(b), 3(c) and 3(d) illustrate the covering member 7. FIG. 3(a) is a plan view taken from the vehicle outer side of the covering member 7, and FIG. 3(b) is a side view of the covering member 7. Besides, FIG. 3(c) is a cross-sectional view taken on line A-A of FIG. 3(a), and FIG. 3(d) is an enlarged view of a part B of FIG. 3(c).

The covering member 7 integrally includes a fixing portion 70, and a first sidewall portion 71, a first inclined wall portion 72, a second sidewall portion 73 and a second inclined wall portion 74 disposed on an outer circumferential side of the fixing portion 70. The fixing portion 70 is in a closed cylindrical shape protruding toward the vehicle outer side, and is provided at the center of the covering member 7. The first sidewall portion 71 extends outward from an end on the vehicle inner side of the fixing portion 70. The first inclined wall portion 72 is provided on an outer circumferential side of the first sidewall portion 71. The second sidewall portion 73 is provided on an outer circumferential side of the first inclined wall portion 72. The second inclined wall portion 74 is provided on an outer circumferential side of the second sidewall portion 73. An inner surface 7a of the covering member 7 includes inner surfaces 71a, 72a, 73a and 74a respectively of the first sidewall portion 71, the first inclined wall portion 72, the second sidewall portion 73 and the second inclined wall portion 74.

The covering member 7 is made of, for example, a cold rolled steel (SPCC), and is molded by press working and subjected to an anti-rust treatment by cationic coating. The covering member 7 has a thickness of, for example, 0.5 to 2.0 mm.

The covering member 7 is fixed by press fitting the fixing portion 70 into the recess portion 60 of the hub ring 6, so as to rotate integrally with the hub ring 6 and the inner ring 3. The first sidewall portion 71, the first inclined wall portion 72, the second sidewall portion 73 and the second inclined wall portion 74 of the covering member 7 cover an end on the vehicle inner side of the bearing section 10. A gap having a width along a direction parallel to the rotation axis O is formed between the first sidewall portion 71, the first inclined wall portion 72, the second sidewall portion 73 and the second inclined wall portion 74, and the bearing section 10. This gap is defined as a cover inner space 7b. In other words, between the inner surface 7a of the covering member 7 and the bearing section 10, the cover inner space 7b having a width along the direction parallel to the rotation axis O is formed.

The first sidewall portion 71 is in the shape of a plate extending outward from the end on the vehicle inner side of the fixing portion 70. The inner surface 71a of the first sidewall portion 71 is a flat surface perpendicular to a direction parallel to a central axis C of the covering member 7. The central axis C accords with the rotation axis O of the hub ring 6 when the covering member 7 is assembled on the hub ring 6. The first inclined wall portion 72 is inclined in a tapered manner from an end on the outer circumferential side of the first sidewall portion 71 toward the vehicle inner side. The inner surface 72a of the first inclined wall portion 72 is farther from the bearing section 10 in a position closer to the second sidewall portion 73.

The end surface 31c on the vehicle inner side of the first inner ring member 31 of the inner ring 3 opposes to, along an axial direction, the inner surface 71a of the first sidewall portion 71 and the inner surface 72a of the first inclined wall portion 72. In other words, the first sidewall portion 71 and the first inclined wall portion 72 cover, from the vehicle inner side, the end surface 31c on the vehicle inner side of the first inner ring member 31 of the inner ring 3.

The second sidewall portion 73 is in the shape of a plate extending outward from the end of the first inclined wall portion 72. The inner surface 73a of the second sidewall portion 73 is a flat surface perpendicular to the direction parallel to the central axis C of the covering member 7. The second sidewall portion 73 covers, from the vehicle inner side, a part on the inside (the side of the inner ring 3) of an end on the vehicle inner side of the first sealing member 51.

The second inclined wall portion 74 is inclined in a tapered manner from an end on the outer circumferential side of the second sidewall portion 73 toward the vehicle outer side. The inner surface 74a of the second inclined wall portion 74 is closer to the bearing section 10 in a position closer to its end on the outer circumferential side. An inclination angle θ (see FIG. 3(d)) of the second inclined wall 74 against the radial direction of the central axis C of the covering member 7 is, for example, 15 to 45°. The inner surface 74a of the second inclined wall portion 74 is in a linear shape on a cross-section along the axial direction including the central axis C of the covering member 7. An end 74b on the outer circumferential side of the second inclined wall portion 74 protrudes toward the vehicle outer side beyond the inner surface 71a of the first sidewall portion 71.

As illustrated in FIG. 2, the second inclined wall portion 74 covers, from the vehicle inner side, a part on the outside (the side of the outer ring 2) of the end on the vehicle inner side of the first sealing member 51. Besides, the second inclined wall portion 74 opposes to an end surface 2e on the vehicle inner side of the outer ring 2, and covers the end surface 2e from the vehicle inner side. Specifically, in the covering member 7, a portion opposing to the end surface 2e of the outer ring 2 (an outer circumferential portion of the second inclined wall portion 74) is not parallel to the end surface 2e. In the other words, in the covering member 7, the portion opposing to the end surface 2e on the vehicle inner side of the outer ring 2 is not parallel to the end surface 2e.

(Operation and Effect of First Embodiment)

Next, the operation and effect of the present embodiment will be described with reference to FIG. 4.

Figure 4:
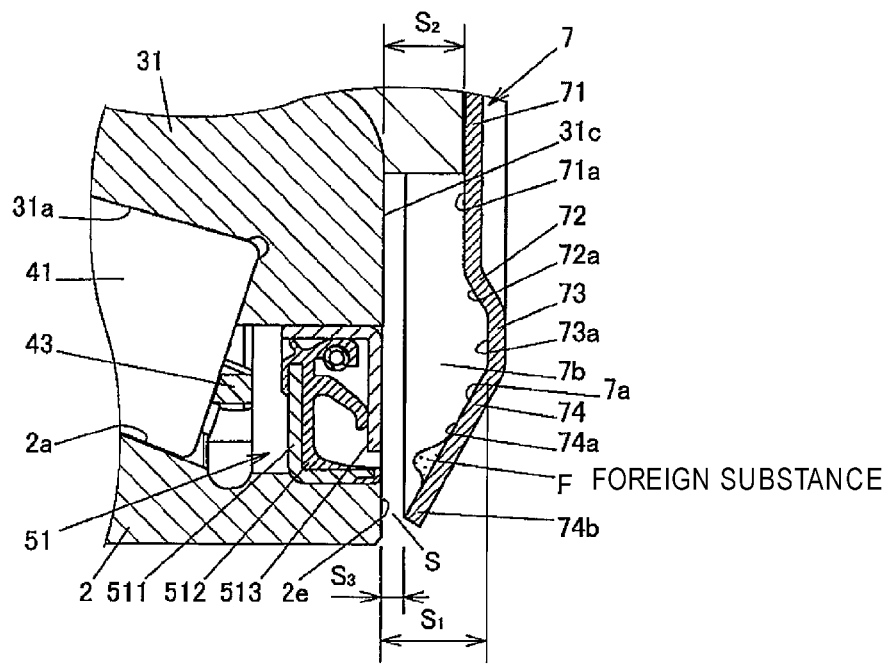
FIG. 4 is an enlarged cross-sectional view of lower ends of the bearing section and the covering member in a state where the hub unit is mounted on a vehicle.

FIG. 4 is an enlarged cross-sectional view of lower ends of the bearing section 10 and the covering member 7 in a state where the hub unit 1 is mounted on a vehicle.

If a foreign substance F such as muddy water having entered the cover inner space 7b adheres to the inner surface 7a of the covering member 7, the foreign substance F flows downward by its own weight. A gap S is formed over the whole circumference between the end 74b on the outer circumferential side of the second inclined wall portion 74 of the covering member 7 and the end surface 2e on the vehicle inner side of the outer ring 2. Therefore, as compared with a case, for example, where a discharge hole such as a drain hole is formed merely in a part along the circumferential direction, the foreign substance F can be more easily discharged.

Besides, while the vehicle is running, the covering member 7 rotates together with the hub ring 6 in accordance with the rotation of the wheel, and hence, a centrifugal force is applied to the foreign substance F adhering to the inner surface 7a of the covering member 7. This centrifugal force moves the foreign substance F outward of the covering member 7. The foreign substance F is discharged to the outside of the cover inner space 7b through the gap S formed between the end 74b on the outer circumferential side of the second inclined wall portion 74 of the covering member 7 and the end surface 2e on the vehicle inner side of the outer ring 2. In this manner, the foreign substance F is urged to be discharged out of the cover inner space 7b by the centrifugal force generated by the rotation of the covering member 7.

Furthermore, in the present embodiment, the first inclined wall portion 72 is disposed between the first sidewall portion 71 and the second sidewall portion 73. The first inclined wall portion 72 is inclined in a tapered manner from the end on the outer circumferential side of the first sidewall portion 71 toward the vehicle inner side. Therefore, a maximum distance along the axial direction between the first sealing member 51 and the covering member 7 is larger than a distance along the axial direction between the inner ring 3 and the covering member 7. Here, the term "maximum distance along the axial direction" refers to the largest distance along the axial direction between the first sealing member 51 and the covering member 7 in a range where these members oppose to each other along the axial direction (the direction parallel to the rotation axis O). More specifically, it refers to the largest distance along the axial direction between an end surface on the vehicle inner side of the first sealing member 51 and the inner surface 7a of the covering member 7 in the cover inner space 7b.

As illustrated in FIG. 4, assuming that the maximum distance along the axial direction between the first sealing member 51 and the covering member 7 is $S_1$ and that the distance along the axial direction between the inner ring 3 and the covering member 7 is $S_2$, the distance $S_1$ is larger than the distance $S_2$. The distance $S_1$ is, for example, 5 to 6 mm, and the distance $S_2$ is, for example, 3 to 4 mm. Here, the distance $S_1$ specifically corresponds to a distance between the end surface on the vehicle inner side of the first sealing member 51 and the inner surface 73a of the second sidewall portion 73. Besides, the distance S corresponds to a distance between the end surface 31c on the vehicle inner side of the first inner ring member 31 and the inner surface 71a of the first sidewall portion 71. Owing to this structure, a width along the direction parallel to the rotation axis O of the cover inner space 7b is enlarged on the vehicle inner side of the first sealing member 51. Therefore, if a foreign substance adhering to the inner surface 7a of the covering member 7 comes off from the covering member 7 due to vibration or the like, the foreign substance is inhibited from adhering again to the first sealing member 51. Accordingly, abrasion of the elastic member 512 otherwise caused by a foreign substance adhering to a sliding contact portion between the elastic member 512 and the slinger 513 in the first sealing member 51 can be suppressed. In other words, degradation of the sealing property of the first sealing member 51 is inhibited.

Moreover, in the present embodiment, the second inclined wall portion 74 is inclined in a tapered manner from the end on the outer circumferential side of the second sidewall portion 73 toward the vehicle outer side. Therefore, a distance between the end on the vehicle inner side of the bearing section 10 and the inner surface 7a of the covering member 7 is the smallest at an end on the outer circumferential side of the covering member 7. In other words, the distance between the bearing section 10 and the covering member 7 is the smallest between the end 74b on the outer circumferential side of the second inclined wall portion 74 and the end surface 2e on the vehicle inner side of the outer ring 2. Accordingly, assuming that a distance along the axial direction between the end 74b on the outer circumferential side of the second inclined wall portion 74 and the end surface 2e on the vehicle inner side of the outer ring 2 is $S_3$, the distance $S_3$ is smaller than the distances $S_1$ and $S_2$. As a result, a foreign substance is inhibited from entering the cover inner space 7b through a gap between the end surface 2e on the vehicle inner side of the outer ring 2 and the covering member 7. A preferable range of the dimension ($S_3$) of the gap between the end 74b on the outer circumferential side of the second inclined wall portion 74 and the end surface 2e on the vehicle inner side of the outer ring 2 is 0.5 to 1.5 mm. If this dimension is smaller than 0.5 mm, a foreign substance may be difficult to be discharged in some cases, and if it is larger than 1.0 mm, a foreign substance easily enters from the outside through the gap S.

(Comparative Example)

Figure 5:
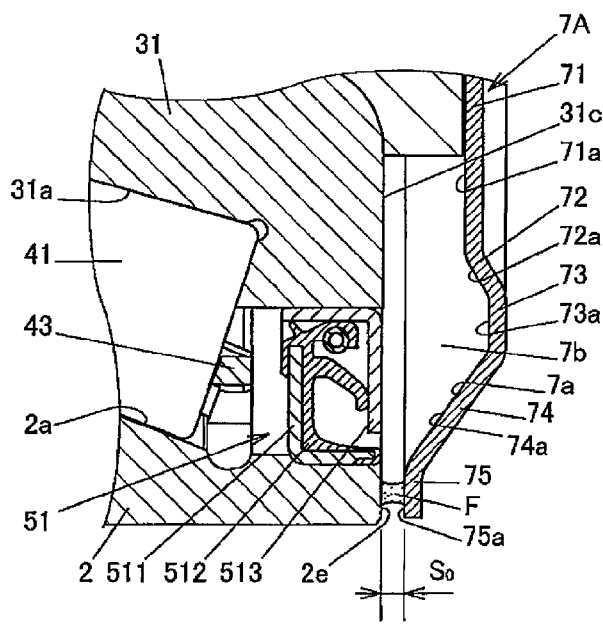
FIG. 5 is a cross-sectional view of a covering member according to a comparative example.

FIG. 5 is a cross-sectional view of a covering member 7A according to a comparative example. This covering member 7A has, similarly to the covering member 7 of the first embodiment, a first sidewall portion 71, a first inclined wall portion 72, a second sidewall portion 73 and a second inclined wall portion 74. However, the covering member 7A has, on the outer circumferential side of the second inclined wall portion 74, a third sidewall portion 75 parallel to an end surface 2e on the vehicle inner side of an outer ring 2. An inner surface 75a of the third sidewall portion 75 opposes to the end surface 2e of the outer ring 2 in parallel. In other words, the covering member 7A of the comparative example is different from the covering member 7 of the first embodiment in the structure including the third sidewall portion 75. Assuming that a distance along the axial direction between the inner surface 75a of the third sidewall portion 75 and the end surface 2e of the outer ring 2 is $S_0$, the distance $S_0$ is assumed to be the same as the distance $S_3$ (see FIG. 4) of the first embodiment.

In the covering member 7A of the comparative example, the inner surface 75a of the third sidewall portion 75 is in parallel to the end surface 2e of the outer ring 2. Therefore, if a foreign substance F is in a liquid form, the foreign substance F is difficult to be discharged to the outside due to its surface tension. In other words, the foreign substance F stays between the inner surface 75a of the third sidewall portion 75 and the end surface 2e of the outer ring 2 to keep it in a state having a small surface area. Owing to the effect of the surface tension to keep the state having a small surface area, the foreign substance F is difficult to be discharged to the outside.

On the other hand, in the present embodiment, the outer circumferential portion of the second inclined wall portion 74 of the covering member 7 is not parallel to the end surface 2e of the outer ring 2. Therefore, as compared with the case where the covering member 7A of the comparative example is used, the effect of the surface tension is reduced, and hence, a foreign substance F is easily discharged out of the cover inner space 7b. Thus, the discharging property for a foreign substance is improved.

Second Embodiment

Figure 6:
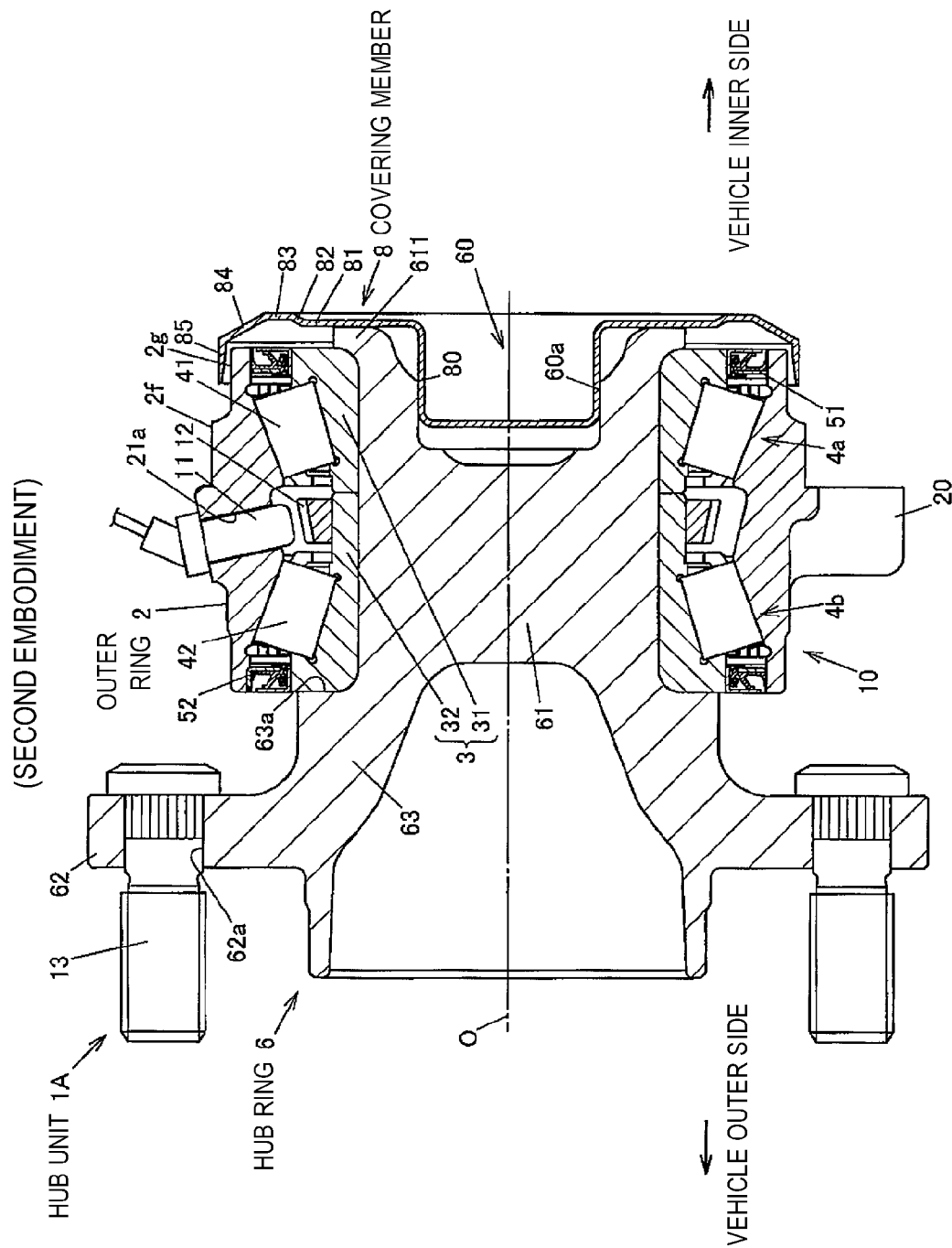
FIG. 6 is a cross-sectional view of a whole hub unit according to a second embodiment of the present invention.
Figure 7:
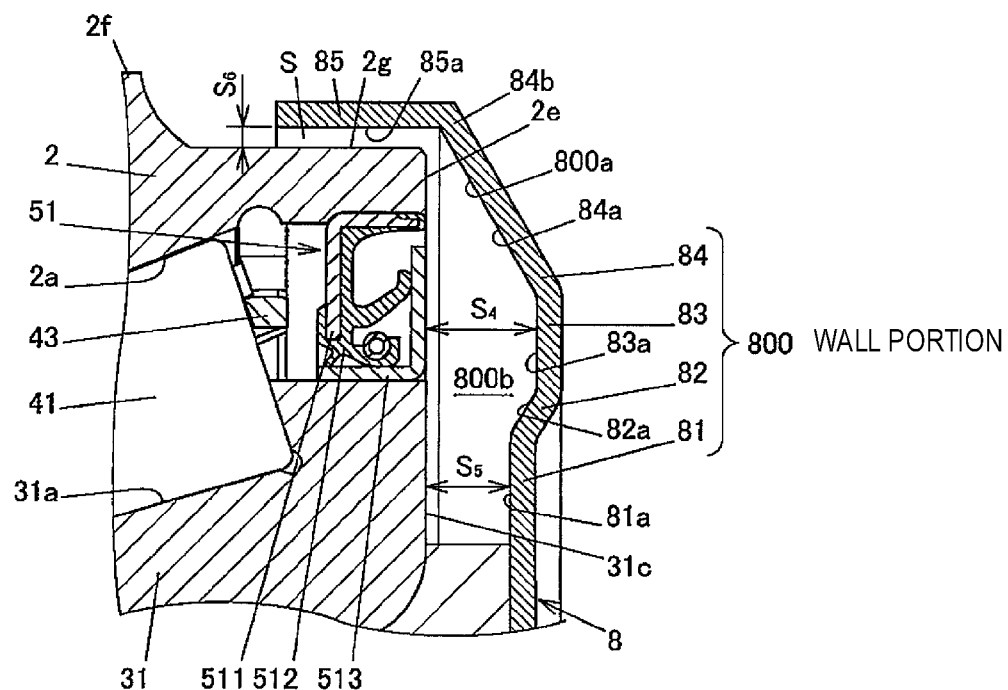
FIG. 7 is a partially enlarged view of FIG. 6.

Next, a second embodiment of the present invention will be described with reference to FIGS. 6 and 7. FIG. 6 is a cross-sectional view of a whole hub unit 1A according to the second embodiment of the present invention. FIG. 7 is a partially enlarged view of FIG. 6.

In the hub unit 1A of the present embodiment, a covering member 8 has a structure different from that of the covering member 7 of the first embodiment. Besides, the hub unit 1A has a level difference formed on the vehicle inner side of a vehicle mounting flange 20 of an outer ring 2. Apart from these structures, the hub unit 1A has the same structure as the hub unit 1 of the first embodiment. In FIGS. 6 and 7, like reference numerals are used to refer to like members and the like described in the first embodiment so as to omit redundant description.

The outer ring 2 has, on an outer circumferential surface on the vehicle inner side of the vehicle mounting flange 20, a knuckle mounting surface 2f for mounting a knuckle of a suspension thereon, and an end outer circumferential surface 2g. The end outer circumferential surface 2g is formed on the vehicle inner side of the knuckle mounting surface 2f. The knuckle mounting surface 2f has a larger diameter than the end outer circumferential surface 2g, and the level difference is formed between the knuckle mounting surface 2f and the end outer circumferential surface 2g.

The covering member 8 additionally includes, as compared with the covering member 7 of the first embodiment, a cylindrical portion 85 covering the end outer circumferential surface 2g corresponding to the outer circumferential surface at the end on the vehicle inner side of the outer ring 2. Apart from this, the covering member 8 has substantially the same structure as the covering member 7 of the first embodiment. Specifically, the covering member 8 integrally includes a fixing portion 80, a first sidewall portion 81, a first inclined wall portion 82, a second sidewall portion 83, a second inclined wall portion 84 and the cylindrical portion 85. The fixing portion 80 is in a closed cylindrical shape fixed in the recess portion 60 of the hub ring 6 by press fit. The first sidewall portion 81 extends outward from an end on the vehicle inner side of the fixing portion 80. The first inclined wall portion 82 is provided on an outer circumferential side of the first sidewall portion 81. The second sidewall portion 83 is provided on an outer circumferential side of the first inclined wall portion 82. The second inclined wall portion 84 is provided on an outer circumferential side of the second sidewall portion 83. The cylindrical portion 85 covers, from the outer circumferential side, the end outer circumferential surface 2g at the end on the vehicle inner side of the outer ring 2.

The covering member 8 rotates integrally with the hub ring 6 and the inner ring 3 because the fixing portion 80 is press fit into the recess portion 60 of the hub ring 6. An inner surface 81a of the first sidewall portion 81 and an inner surface 83a of the second sidewall portion 83 are flat surfaces perpendicular to the direction parallel to the rotation axis O. The first inclined wall portion 82 is inclined in a tapered manner from an end on the outer circumferential side of the first sidewall portion 81 toward the vehicle inner side, and is disposed between the first sidewall portion 81 and the second sidewall portion 83.

The second inclined wall portion 84 is inclined in a tapered manner from an end on the outer circumferential side of the second sidewall portion 83 toward the vehicle outer side. An end 84b on the outer circumferential side of the second inclined wall portion 84 protrudes outward along the radial direction beyond the end outer circumferential surface 2g of the outer ring 2. The cylindrical portion 85 extends from the end 84b on the outer circumferential side of the second inclined wall portion 84 toward the vehicle outer side. A gap S is formed between the cylindrical portion 85 and the end outer circumferential surface 2g of the outer ring 2.

The end surface 31c on the vehicle inner side of the first inner ring member 31 of the inner ring 3 opposes to, along the axial direction, the inner surface 81a of the first sidewall portion 81 and an inner surface 82a of the first inclined wall portion 82. The first sealing member 51 opposes to, along the axial direction, a part disposed on the inner side along the radial direction of an inner surface 84a of the second inclined wall portion 84 and the inner surface 83a of the second sidewall portion 83. The end surface 2e on the vehicle inner side of the outer ring 2 opposes to, along the axial direction, a part disposed on the outer side along the radial direction of the inner surface 84a of the second inclined wall portion 84.

In the covering member 8, the first sidewall portion 81, the first inclined wall portion 82, the second sidewall portion 83 and the second inclined wall portion 84 together form a wall portion 800 covering the end on the vehicle inner side of the bearing section 10. In other words, the covering member 8 coaxially includes the fixing portion 80, the wall portion 800 and the cylindrical portion 85. A cover inner space 800b is formed between an inner surface (a surface on the side of the bearing section 100) 800a of the wall portion 800 and the bearing section 10.

In the cover inner space 800b, a maximum distance along the axial direction between the first sealing member 51 and the covering member 8 is larger than a distance along the axial direction between the inner ring 3 and the covering member 8. Here, the term "maximum distance along the axial direction" refers to the largest distance along the axial direction between the first sealing member 51 and the covering member 8 in a range where these members oppose to each other along the axial direction (the direction parallel to the rotation axis O). More specifically, it refers to the largest distance along the axial direction between the end surface on the vehicle inner side of the first sealing member 51 and the inner surface 800a of the covering member 8 in the cover inner space 800b.

As illustrated in FIG. 7, assuming that the maximum distance along the axial direction between the first sealing member 51 and the covering member 8 is $S_4$, and that the distance along the axial direction between the inner ring 3 and the covering member 8 is $S_5$, the distance $S_4$ is larger than the distance $S_5$. The distance $S_4$ is, for example, 5 to 6 mm, and the distance $S_5$ is, for example, 3 to 4 mm. Here, the distance $S_4$ specifically corresponds to a distance between the end surface on the vehicle inner side of the first sealing member 51 and the inner surface 83a of the second sidewall portion 83. Besides, the distance $S_5$ corresponds to a distance between the end surface 31c on the vehicle inner side of the first inner ring member 31 and the inner surface 81a of the first sidewall portion 81.

In the present embodiment, the cylindrical portion 85 extends in parallel to the rotation axis O. A circular gap S having a substantially constant width is formed over the whole circumference between an inner circumferential surface 85a of the cylindrical portion 85 and the end outer circumferential surface 2g of the outer ring 2. Therefore, a foreign substance can be discharged out of the cover inner space 800b through the gap S. Besides, the covering member 8 can be smoothly rotated without causing a contact between the covering member 8 and the outer ring 2.

Assuming that a distance between the inner circumferential surface 85a of the cylindrical portion 85 and the end outer circumferential surface 2g of the outer ring 2 (a width along the radial direction of the gap S) is $S_6$, a preferable range of the distance $S_6$ is 0.5 to 1.5 mm. If the distance $S_6$ is smaller than 0.5 mm, a foreign substance may be difficult to be discharged out of the cover inner space 800b in some cases. On the other hand, if the distance $S_6$ is larger than 1.0 mm, a foreign substance easily enters from the outside through the gap S.

(Operation and Effect of Second Embodiment)

According to the hub unit 1A of the present embodiment, a foreign substance is easily discharged as compared with a case where a drain hole is formed, for example, merely in a part along the circumferential direction. Besides, while the vehicle is running, the covering member 8 rotates together with the hub ring 6 in accordance with the rotation of the wheel, a centrifugal force is applied to a foreign substance adhering to the inner surface 800a of the wall portion 800 of the covering member 8. Therefore, the foreign substance is urged to be discharged by the centrifugal force.

Besides, the maximum distance ($S_4$) along the axial direction between the first sealing member 51 and the covering member 8 is larger than the distance along the axial direction ($S_5$) between the inner ring 3 and the covering member 8. Therefore, if a foreign substance adhering to the inner surface 800a of the wall portion 800 comes off from the covering member 8 due to vibration or the like, the foreign substance is inhibited from adhering again to the first sealing member 51.

In addition, in the present embodiment, the end outer circumferential surface 2g at the end on the vehicle inner side of the outer ring 2 is covered by the cylindrical portion 85 of the covering member 8. Therefore, even if a foreign substance such as muddy water or gravels splashed or hit by a wheel comes from outside along the radial direction of the outer ring 2, the foreign substance can be blocked by the cylindrical portion 85. Accordingly, the foreign substance can be inhibited from entering the cover inner space 800b.

Third Embodiment

Figure 8A:
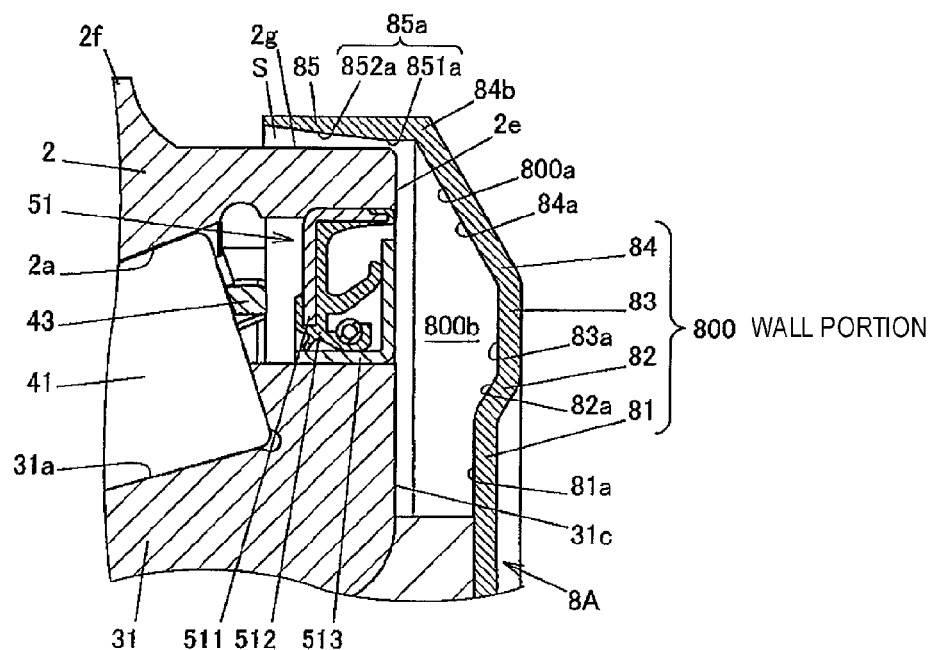
Figure 8B:
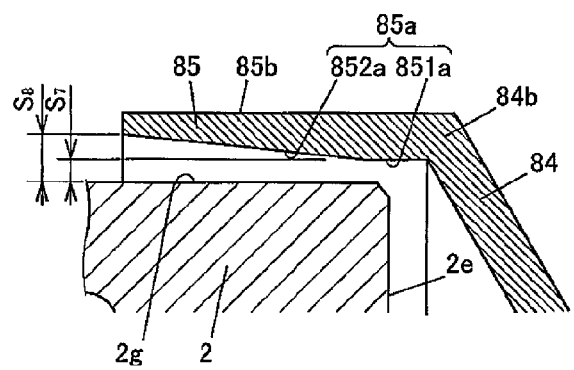

Next, a third embodiment of the present invention will be described with reference to FIGS. 8 (a) and 8 (b). FIGS. 8(a) and 8 (b) illustrate a covering member 8A according to the third embodiment, and FIG. 8(a) is a cross-sectional view of a part on the outer circumferential side of the covering member 8A and FIG. 8(b) is an enlarged cross-sectional view in which a part of FIG. 8(a) is enlarged.

The covering member 8A of the present embodiment is a modification in the shape of the cylindrical portion 85 of the covering member 8 of the second embodiment, and apart from this, the structure is the same as that of the second embodiment. Now, differences from the second embodiment will be principally described.

In the covering member 8A of the present embodiment, at least a part of an inner circumferential surface 85a of the cylindrical portion 85 is in a tapered shape having an inner diameter increasing toward the vehicle outer side. More specifically, the inner circumferential surface 85a of the cylindrical portion 85 of the present embodiment includes a first inner circumferential surface 851a disposed on the vehicle inner side, and a second inner circumferential surface 852a in the tapered shape disposed on the vehicle outer side. The second inner circumferential surface 852a is in the tapered shape having an inner diameter increasing toward the vehicle outer side. The first inner circumferential surface 851a is parallel to the rotation axis O.

A distance of the second inner circumferential surface 852a of the cylindrical portion 85 from the end outer circumferential surface 2g of the outer ring 2 is larger toward the vehicle outer side. Assuming that a distance between the first inner circumferential surface 851a and the end outer circumferential surface 2g is $S_7$, and that a distance between the an end on the vehicle outer side of the second inner circumferential surface 852a and the end outer circumferential surface 2g is $S_8$, the distance $S_8$ is larger than the distance $S_7$. A difference between the distances $S_8$ and $S_7$ ($S_8-S_7$) is, for example, 0.5 to 1.0 mm.

In the present embodiment, an outer circumferential surface 85b of the cylindrical portion 85 is parallel to the end outer circumferential surface 2g of the outer ring 2, and the thickness of the cylindrical portion 85 is reduced toward the vehicle outer side. Therefore, the second inner circumferential surface 852a is in the tapered shape having an inner diameter increasing toward the vehicle outer side. However, the thickness of the cylindrical portion 85 may be constant with the outer diameter of the outer circumferential surface 85b corresponding to the second inner circumferential surface 852a increased toward the vehicle outer side.

(Operation and Effect of Third Embodiment)

According to the present embodiment, the same operation and effect as those of the second embodiment are attained. Besides, in the present embodiment, the second inner circumferential surface 852a of the inner circumferential surface 85a of the cylindrical portion 85 is in the tapered shape having an inner diameter increasing toward the vehicle outer side. Therefore, a centrifugal force is applied to a foreign substance adhering to the second inner circumferential surface 852a by rotation of the covering member 8A, and hence the foreign substance is moved toward the vehicle outer side to be discharged through the gap S. Accordingly, the discharging property for a foreign substance is further improved than in the second embodiment.

The present invention has been described so far on the basis of the first through third embodiments, and it is noted that the present invention is not limited to these embodiments. The present invention can be practiced in various forms without departing from the sprit and the scope thereof. For example, although the rolling elements 41 and 42 are the tapered rollers in each of the aforementioned embodiments, a spherical rolling element can be used.

Besides, in each of the aforementioned embodiments, the present invention is applied to the hub unit for a non-driven wheel to which a driving force of a driving source such as an engine is not transmitted. The present invention can be, however, applied to a hub unit for a drive wheel to which a driving force of a driving source is transmitted. In this case, a through hole for inserting a drive shaft is formed in the center of the covering member. Besides, the hub ring is provided with a through hole having a serration, for relatively rotatably connected to the drive shaft, formed on the inner circumferential surface thereof.

Furthermore, the structures of the covering members 7, 8 and 8A are not limited to those specifically described in the first through third embodiments, but can be appropriately modified. For example, in the covering member 7 of the first embodiment, the second inclined wall portion 74 may be continuously formed on the outer circumferential side of the first inclined wall portion 72 without forming the second sidewall portion 73. In this case, the largest distance along the axial direction between the end surface on the vehicle inner side of the first sealing member 51 and the inner surface 72a or 74a of the first inclined wall portion 72 or the second inclined wall portion 74 corresponds to the "maximum distance along the axial direction". Besides, also in the covering members 8 and 8A of the second and third embodiments, the second inclined wall portion 84 may be similarly continuously formed on the outer circumferential side of the first inclined wall portion 82. In this case, the largest distance along the axial direction between the end surface on the vehicle inner side of the first sealing member 51 and the inner surface 82a or 84a of the first inclined wall portion 82 or the second inclined wall portion 84 corresponds to the "maximum distance along the axial direction".

This application is based upon the prior Japanese patent application (Japanese Patent Application No. 2013-259905) filed on Dec. 17, 2013, the entire contents of which are incorporated herein by reference.

INDUSTRIAL APPLICABILITY

According to the present invention, degradation of the sealing property of a sealing member otherwise caused by a foreign substance having entered a covering member of a hub unit can be inhibited by urging discharge of the foreign substance.

REFERENCE SIGNS LIST 1, 1A . . . hub unit
2 . . . outer ring
2a, 2b . . . outer raceway surface
2c, 2d . . . seal mounting surface
2e . . . end surface
2f . . . knuckle mounting surface
2g . . . end outer circumferential surface
3 . . . inner ring
4a, 4b . . . rolling element row
6 . . . hub ring
7, 7A . . . covering member
7a . . . inner surface
7b . . . cover inner space
8, 8A . . . covering member
10 . . . bearing section
10a . . . bearing inner space
11 . . . rotation sensor
12 . . . pulser ring
13 . . . hub bolt
20 . . . vehicle mounting flange
21a . . . sensor mounting hole
31 . . . first inner ring member
31a . . . inner raceway surface
31b . . . seal mounting surface
31c . . . end surface
32 . . . second inner ring member
32a . . . inner raceway surface
32b . . . seal mounting surface
32c . . . ring mounting surface
41, 42 . . . rolling element
43, 44 . . . cage
51 . . . first sealing member
52 . . . second sealing member
60 . . . recess portion
60a . . . inner surface
61 . . . body portion
62 . . . wheel mounting flange portion
62a . . . bolt insertion hole
63 . . . connecting portion
63a . . . end surface
70 . . . fixing portion
71 . . . first sidewall portion
72 . . . first inclined wall portion
73 . . . second sidewall portion
74 . . . second inclined wall portion
74b . . . end
75 . . . third sidewall portion
71a, 72a, 73a, 74a, 75a . . . inner surface
80 . . . fixing portion
81 . . . first sidewall portion 82 . . . first inclined wall portion
83 . . . second sidewall portion
84 . . . second inclined wall portion
81a, 82a, 83a, 84a . . . inner surface
84b . . . end
85 . . . cylindrical portion
85a . . . inner circumferential surface
85b . . . outer circumferential surface
511, 521 . . . core plate
512, 522 . . . elastic member
513, 523 . . . slinger
611 . . . caulking portion
800 . . . wall portion
800a . . . inner surface
800b . . . cover inner space
851a . . . first inner circumferential surface
852a . . . second inner circumferential surface
C . . . central axis
F . . . foreign substance
O . . . rotation axis
S . . . gap

The invention claimed is:

1. A hub unit comprising:
a bearing section including an outer ring unrotatably mounted on a vehicle body side, an inner ring disposed coaxially with and inside the outer ring, a plurality of rolling elements disposed in a bearing inner space between the outer ring and the inner ring, and a sealing member sealing the bearing inner space at an end on a vehicle inner side;
a hub ring including a body portion inserted inside the inner ring, and a wheel mounting flange portion on which a wheel is to be mounted; and
a covering member protecting the bearing section from a foreign substance, wherein
the covering member is fixed to rotate integrally with the hub ring and the inner ring, and covers an end on the vehicle inner side of the bearing section, and
an entirety of an end portion of an opposing part of the covering member opposing to an end surface on the vehicle inner side of the outer ring is not parallel to the end surface.

2. The hub unit according to claim 1, wherein
a maximum distance along an axial direction between the sealing member and the covering member is larger than a distance along the axial direction between the inner ring and the covering member.

3. A hub unit comprising:
a bearing section including an outer ring unrotatably mounted on a vehicle body side, an inner ring disposed coaxially with and inside the outer ring, a plurality of rolling elements disposed in a bearing inner space between the outer ring and the inner ring, and a sealing member sealing the bearing inner space at an end on a vehicle inner side;
a hub ring including a body portion inserted inside the inner ring, and a wheel mounting flange portion on which a wheel is to be mounted; and
a covering member protecting the bearing section from a foreign substance, wherein
the covering member is fixed to rotate integrally with the hub ring and the inner ring, and includes a wall portion covering an end on the vehicle inner side of the bearing section and a cylindrical portion covering an outer circumferential surface at an end on the vehicle inner side of the outer ring, an entirety of an end portion of the wall part that is opposed to an end surface of the vehicle inner side of the outer ring is at an inclined angle with respect to the end surface, and
a gap is formed between the cylindrical portion of the covering member and the outer circumferential surface of the outer ring.

4. The hub unit according to claim 3, wherein
at least a part of an inner circumferential surface of the cylindrical portion of the covering member is in a tapered shape having an inner diameter increasing toward a vehicle outer side.

5. The hub unit according to claim 3, wherein
a maximum distance along an axial direction between the sealing member and the covering member is larger than a distance along the axial direction between the inner ring and the covering member.

* * * * *